United States Patent [19]

Furuya et al.

[11] 4,423,942
[45] Jan. 3, 1984

[54] CAMERA WITH SELECTABLE ELECTROMAGNETIC AND MECHANICAL SHUTTER RELEASE

[75] Inventors: Mikihito Furuya, Chofu; Koichi Daitoku, Sagamihara, both of Japan

[73] Assignee: Nippon Kagaku K.K., Tokyo, Japan

[21] Appl. No.: 316,416

[22] Filed: Oct. 29, 1981

[30] Foreign Application Priority Data

Nov. 5, 1980 [JP] Japan .................. 55-155476

[51] Int. Cl.³ ............................ G03B 17/38
[52] U.S. Cl. ................... 354/266; 354/234.1
[58] Field of Search ............... 354/234, 235, 266, 268

[56] References Cited

U.S. PATENT DOCUMENTS 4,118,724 10/1978 Ueda et al. .................. 354/266
4,313,660 2/1982 Nakano et al. ................ 354/234

Primary Examiner—A. A. Mathews
Attorney, Agent, or Firm—Shapiro and Shapiro

[57] ABSTRACT

In a camera including an electromagnetic release device for releasing a shutter mechanism for the purpose of exposure in response to the moving operation of a release member over a predetermined stroke, a mechanical release device for releasing the shutter mechanism for the purpose of exposure in response to the moving operation of the release member over a stroke exceeding the predetermined stroke, and a limiting device for limiting the movement of the release member within the range of the predetermined stroke in response to the electromagnetic release mode selecting operation of a mode selecting member and for releasing the limitation in response to the mechanical release mode selecting operation of the mode selecting member, there is provided means for impeding the operation of the changeover device for the selection of the mechanical release mode when the electromagnetic release mode is selected, releasing means operable to release the impediment by the impeding means, and means for operatively associating the release of the limitation by the limiting device with the operation of the releasing means.

5 Claims, 4 Drawing Figures

CAMERA WITH SELECTABLE ELECTROMAGNETIC AND MECHANICAL SHUTTER RELEASE

BACKGROUND OF THE INVENTION

1. Field of the Invention

This invention relates to a camera which is capable of selecting one of an electromagnetic release mode in which a shutter is electromagnetically released and a mechanical release mode in which the shutter is mechanically released.

2. Description of the Prior Art

A camera of this type in which the electromagnetic release mode is normally selected and the mechanical release mode is selected as required by rotating a shutter dial is disclosed in U.S. Pat. No. 4,118,724. This camera of the prior art is such that during the electromagnetic release mode a shutter release operating button is limited to a short stroke to electromagnetically release the shutter and when the mechanical release mode is selected by rotation of the shutter dial, the limitation of the stroke of the release button is released through an interlocking mechanism operatively associated with the shutter dial to mechanically release the shutter with a long stroke of the release button.

However, in this conventional camera, there is an undesirable possibility that if the shutter dial is inadvertently operated, the camera is changed over from the electromagnetic release mode to the mechanical release mode. It is therefore preferable to provide a safety device in order to prevent inadvertent change-over from the electromagnetic release mode to the mechanical release mode.

SUMMARY OF THE INVENTION

It is an object of the present invention to provide, in a camera which is capable of an electromagnetic release mode and a mechanical release mode, a release mode selecting device which is simple in mechanism and which has a safety device that operates in association with the limitation of the stroke of a shutter release button.

The invention will become fully apparent from the following detailed description thereof taken in conjunction with the accompanying drawings.

DESCRIPTION OF THE PREFERRED EMBODIMENT

An embodiment of the present invention will hereinafter be described with reference to the drawings. This is an example in which the present invention is applied to a camera having an electromagnetic release device.

Figure 1:
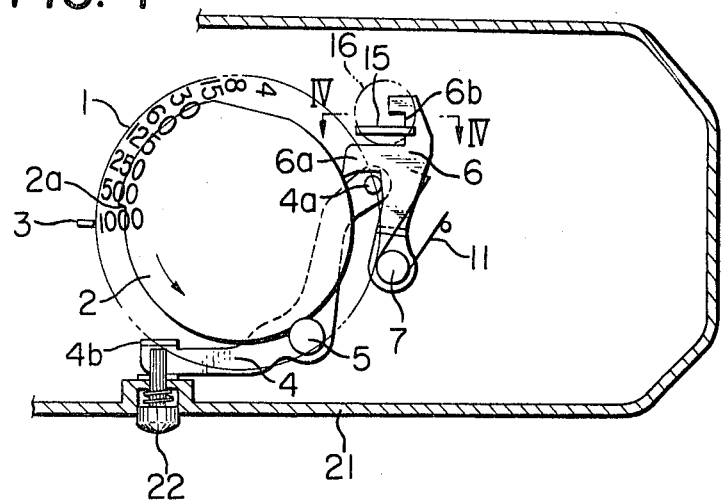
FIG. 1 is a front cross-sectional view showing an embodiment of the present invention.

Referring to FIG. 1, a shutter dial 1 having predetermined shutter speeds carved therein and a cam disc 2 coaxial therewith are provided for rotation together, and an exposure setting member, not shown, is operatively associated with these so that a set exposure is indicated at a position corresponding to the fixed index mark 3 of a camera body 21. A stepped portion 2a is formed on the outer peripheral surface of the cam disc 2.

Figure 4:
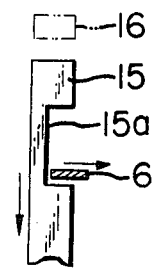
FIG. 4 is a cross-sectional view taken along line IV—IV in FIG. 1.

Near the cam disc 2, the central portion of a releasing lever 4 is pivotally mounted by a pin 5, and a pin 4a studded in one end of this lever 4 is engaged with a limiting lever 6. The lever 6 has one end thereof pivotally mounted on a pin 7 and is biased counter-clockwise as viewed in FIG. 1 by a spring 11, and the free end portion of the lever 6 is provided with a bearing portion 6a and a cut-away portion 6b. As shown in FIG. 4, the cut-away portion 6b is engageable by the cut-away portion 15a of a release lever 15 operatively associated with a shutter release button 16. As can be seen in FIGS. 1 and 4, the direction of pivotal movement of the free end of the limiting lever 6 is substantially orthogonal to the direction of movement of the release lever 15.

On the other hand, a bent portion 4b formed at the other end of the lever 4 bears against a releasing button 22 extending through a camera body 21 and movable along the through-hole.

As shown in FIG. 1, when any one of the numbers 1000-1 on the shutter dial 1 is in registration with the index mark 3, the bearing portion 6a of the lever 6 is in a counter-clockwise rotated position while bearing against the outer peripheral surface of the cam disc 2, and the cut-away portion 6b and the cut-away portion 15a are in their engaged position as shown in FIG. 4. Accordingly, the release button 16 and the release lever 15 can only be depressed by a short stroke corresponding to the length of the cut-away portion 15a.

When the release button 16 is depressed with any one of the numbers 1000-1 representative of the shutter times 1/1000-1 second being in registration with the index mark 3, the unshown electromagnetic release device of the camera is operated in response to the short stroke of the release button 16 and a forward shutter curtain restraining magnet in this device releases the restraint of the forward shutter curtain. Simultaneously therewith, a well-known electrical timer circuit begins to operate and when this timer circuit counts the shutter time indicated by the index mark 3, a rearward shutter curtain restraining magnet releases the restraint of the rearward shutter curtain. Thus, the rearward shutter curtain runs. In this manner, electromagnetic release mode photography is effected.

Figure 2:
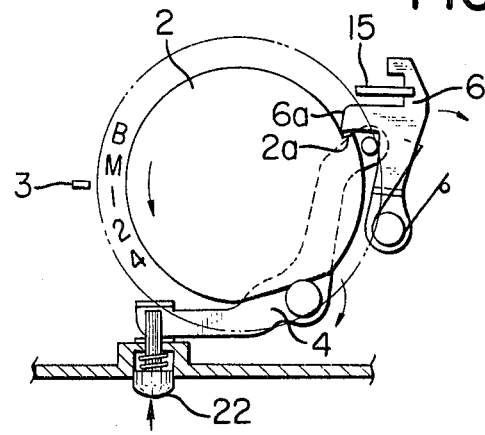
FIGS. 2 and 3 illustrate the operation of the embodiment.

When the index mark 3 indicates between "1" and "M" as shown in FIG. 2, the bearing portion 6a bears against the stepped portion 2a, so that the cam disc 2 cannot be rotated any further in counter-clockwise rotation. Accordingly, the camera cannot be changed over from the electromagnetic release mode to the mechanical release mode.

Figure 3:
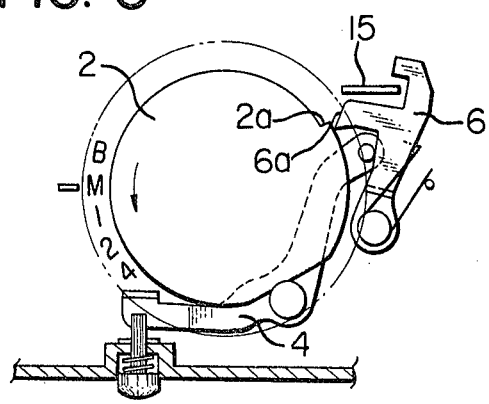

When the releasing button 22 is depressed, the releasing lever 4 pivots clockwise and the pin 4a is displaced to pivotally move the lever 6 clockwise and, as shown in FIG. 3, the engagement between the lever bearing portion 6a and the stepped portion 2a is released while, at the same time, the engagement between the lever cut-away portion 6b and the cut-away portion 15a is released. As a result, the cam disc 2 becomes rotatable counter-clockwise and the lever 15 becomes free to move over a long stroke. If, in this manner, the dial 1 is rotated counter-clockwise after the depression of the button 22, the character M or B on the dial 1 can be brought into registration with the index mark 3 and the mechanical release mode can be set. "M" signifies a mechanically controlled shutter speed of 1/90 second, for example, and "B" signifies a bulb.

When the release button 16 is depressed after the character "M" or "B" on the dial 1 has been brought into registration with the index mark 3, a long stroke of the button 16 is obtained because the lever 6 is retracted from the cut-away 15a, and the unshown mechanical release device of the camera operates in response to the long stroke of the button 16 and a mechanical restraining mechanism in this device releases the restraint of the forward shutter curtain. Thereafter, exposure time is mechanically controlled and the mechanical restraint of the rearward shutter curtain is released. Thus, the rearward shutter curtain runs. In this manner, the mechanical release mode photography is effected without using electricity.

As described above, the present device is such that unless the photographer depresses the button 22 of his own will, the mode will never inadvertently shift from the electromagnetic release mode to the mechanical release mode.

The cam disc 2 is not rotatable any further in counter-clockwise direction from the position in which the index mark 3 indicates "B" and, when the electromagnetic release mode is again selected, the cam disc 2 will be rotated clockwise.

While in the above-described embodiment the shutter speed is controlled by the electrical timer circuit in case of the electromagnetic release mode, the shutter speed may also be controlled by a mechanical mechanism (a speed governing mechanism such as a governor). However, where the shutter is released in the mechanical release mode, it is desirable to control the shutter speed by a mechanical mechanism as in the embodiment. This is because the mechanical release mode is used chiefly when the power source has been consumed.

Also, a slide type or a rotation type releasing operating member may be used instead of the depression type releasing button 22.

The limiting lever 6 may comprise a plurality of levers operatively associated with each other, whereby the degree of freedom can be increased in the spatial arrangement of the cam disc 2 and the release lever 15 and in their directions of movement.

We claim:

1. A camera which enables an electromagnetic release operation for releasing a shutter mechanism by an electromagnetic release device and a mechanical release operation for releasing said shutter mechanism by a mechanical release device, comprising:
   (a) a release member operable to drive said electromagnetic release device and said mechanical release device, said release member being displaceable along a first stroke for triggering said electromagnetic release device and along a second stroke exceeding said first stroke for triggering said mechanical release device;
   (b) a limiting member for controlling the displacement of said release member and which is displaceable between a first position where the displacement of said release member is limited to said first stroke and a second position where the displacement of said release member along said second stroke is allowed;
   (c) a release mode selecting member operable to move between a first range associated with said electromagnetic release operation and a second range associated with said mechanical release operation, said release mode selecting member and said limiting member having cooperable means for keeping said limiting member at said first position when said release mode selecting member is positioned in said first range and for keeing said limiting member at said second position when said release mode selecting member is positioned in said second range;
   (d) impeding means for acting on said release mode selecting member in order to prevent said release mode selecting member from moving from said first range to said second range when said limiting member is located at said first position; and
   (e) a manually operating member which is operable to displace said limiting member to said second position.

2. The camera according to claim 1, wherein said impeding means is provided between said release mode selecting member and said limiting member and wherein said cooperable means is operable to move said limiting member to said second position when said release mode selecting member moves from said first range to said second range.

3. The camera according to claim 1, wherein said release mode selecting member includes a selection operation member and said cooperable means includes a cam member operatively associated with said selection operation member, said cam member having a first cam surface for keeping said limiting member at said first position and a second cam surface for keeping said limiting member at said second position, and wherein said impeding means includes a stepped portion formed between said first surface and said second surface and includes a latching formation on said limiting member which is engaged with said stepped portion.

4. The camera according to claim 1, wherein said limiting member has means for urging said limiting member in the direction of said first position.

5. A camera which enables an electromagnetic release operation for releasing a shutter mechanism by an electromagnetic release device and a mechanical release operation for releasing said shutter mechanism by a mechanical release device, comprising:
   (a) a release member operable to drive said electromagnetic release device and said mechanical release device, said release member being displaceable along a first stroke for triggering said electromagnetic release device and along a second stroke exceeding said first stroke for triggering said mechanical release device;
   (b) a shutter speed setting dial member having a first operation range and a second operation range, said first operation range being selected for said electromagnetic release operation and said dial being displaced from said first operation range to said second operation range for selection of said mechanical release operation;
   (c) a limiting member for controlling the displacement of said release member and which is displaceable between a first position where the displacement of said release member is limited to said first stroke and a second position where the displacement of said release member along said second stroke is allowed;
   (d) means for impeding the displacement of said setting dial member from said first operation range to said second operation range when said limiting member is located at said first position;

(e) means operatively associated with said setting dial member for keeping said limiting member at said first position when said setting dial member is at said first operation range and for keeping said limiting member at said second position when said setting dial member is at said second operation range; and (f) manually operating means which is operable to displace said limiting member to said second position.

* * * * *